United States Patent
Xu et al.

(10) Patent No.: US 12,167,011 B2
(45) Date of Patent: *Dec. 10, 2024

(54) EXTENDING SEARCH RANGE FOR REFERENCE BLOCKS BEYOND CURRENT CTU

(71) Applicant: TENCENT AMERICA LLC, Palo Alto, CA (US)

(72) Inventors: Xiaozhong Xu, State College, PA (US); Shan Liu, San Jose, CA (US); Xiang Li, Saratoga, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,136

(22) Filed: Sep. 5, 2023

(65) Prior Publication Data

US 2023/0412829 A1     Dec. 21, 2023

Related U.S. Application Data

(63) Continuation of application No. 17/943,671, filed on Sep. 13, 2022, now Pat. No. 11,785,240, which is a
(Continued)

(51) Int. Cl.
*H04N 19/51*     (2014.01)
*H04N 19/105*    (2014.01)
(Continued)

(52) U.S. Cl.
CPC ........... *H04N 19/45* (2014.11); *H04N 19/105* (2014.11); *H04N 19/159* (2014.11);
(Continued)

(58) Field of Classification Search
CPC .... H04N 19/45; H04N 19/105; H04N 19/159; H04N 19/176; H04N 19/51; H04N 19/82; H04N 19/96
(Continued)

(56) References Cited

FOREIGN PATENT DOCUMENTS

KR     10-2447508 B1     9/2022

OTHER PUBLICATIONS

Bross et al., "Versatile Video Coding (Draft 3)" Joint Video Experts Team (JVET) of ITU-T SG 16 WP 3 and ISO/IEC JTC 1/SC 29/WG 11, Oct. 3-12, 2018, JVET-L1001-v7, 12th Meeting: Macao, CN, 225 pages.
(Continued)

*Primary Examiner* — Nguyen T Truong
(74) *Attorney, Agent, or Firm* — ArentFox Schiff LLP

(57) ABSTRACT

A method of video encoding includes determining whether a reference block for a current block is located in a different coding tree unit (CTU) than a CTU of the current block. The method also includes, in response to the reference block being located in the different CTU, (i) determining whether a memory location of a reference sample memory for the reference block is available. The second area is collocated in the different CTU with a position of the first area in the CTU of the current block. In response to the determination that the reference block is located in the different CTU, the method also includes, (ii) in response to a determination that the memory location for the reference block is available, retrieving, from the memory location corresponding to the reference block, one or more samples to encode the current block.

20 Claims, 15 Drawing Sheets

Related U.S. Application Data continuation of application No. 17/306,639, filed on May 3, 2021, now Pat. No. 11,483,581, which is a continuation of application No. 16/880,578, filed on May 21, 2020, now Pat. No. 11,039,158, which is a continuation of application No. 16/502,822, filed on Jul. 3, 2019, now Pat. No. 10,701,385.

(60) Provisional application No. 62/791,862, filed on Jan. 13, 2019.

(51) Int. Cl.
*H04N 19/159* (2014.01)
*H04N 19/176* (2014.01)
*H04N 19/44* (2014.01)
*H04N 19/82* (2014.01)
*H04N 19/96* (2014.01)

(52) U.S. Cl.
CPC ......... *H04N 19/176* (2014.11); *H04N 19/51* (2014.11); *H04N 19/82* (2014.11); *H04N 19/96* (2014.11)

(58) Field of Classification Search
USPC .................................................. 375/240.24
See application file for complete search history.

(56) References Cited

OTHER PUBLICATIONS

Joshi et al., "High Efficiency Video Coding (HEVC) Screen Content Coding: Draft 6," Joint Collaborative Team on Video Coding (JCT-VC) of ITU-T SG 16 WP 3 and ISO/IEC JTC 1/SC 29/WG 11, Feb. 19-26, JCTVC-W1005-v4, 23rd Meeting: San Diego, USA, 673 pages.

Liu et al., "Overview of HEVC extensions on screen content coding," Industrial Technology Advances, 2015, vol. 4, pp. 1-12.

Office Action in 202080007690.7, mailed Feb. 7, 2022, 11 pages.

Xu et al., "CE8-related: CPR mode with local search range optimization," Joint Video Experts Team (JVET) of ITU-T SG 16 WP 3 and ISO/IEC JTC 1/SC 29/WG 11, Oct. 3-12, 2018, JVET-L0297-v1, 12th Meeting: Macao, CN, 6 pages.

Xu et al., "CE8: CPR mode with local search ranges (Test CE8.3.1 and CE8.3.2)," Joint Video Experts Team (JVET) of ITU-T SG 16 WP 3 and ISO/IEC JTC 1/SC 29/WG 11, Oct. 3-12, 2018, JVET-L0293-v2, 12th Meeting: Macao, CN, 5 pages.

Xu et al., "CE8: CPR reference memory reuse without increasing memory requirement (CE8.1.2a and CE8.1.2d)," Joint Video Experts Team (JVET) of ITU-T SG 16 WP 3 and ISO/IEC JTC 1/SC 29/WG 11, Jan. 9-18, 2019, JVET-M0407-v2, 13th Meeting: Marrakesh, MA, 11 pages.

Xu et al., "Description of Core Experiment 8: Screen Content Coding Tools," Joint Video Experts Team (JVET) of ITU-T SG 16 WP 3 and ISO/IEC JTC 1/SC 29/WG 11, Oct. 3-12, 2018, JVET-L1028-v2, 12th Meeting: Macao, CN, 15 pages.

Xu et al., "Intra Block Copy in HEVC Screen Content Coding Extensions," IEEE Journal on Emerging and Selected Topics in Circuits and Systems, 2016, vol. 6, No. 4, pp. 409-419.

Office Action received for Chinese Patent Application No. 202310004608.0, mailed on May 27, 2024, 6 pages.

Office Action received for Korean Patent Application No. 10-2022-7032873, mailed on May 23, 2024, 14 pages 7 pages of English Translation and 7 pages of Original Document).

Xu et al., "Non-CE8: IBC search range increase for small CTU size," Joint Video Experts Team (JVET) of ITU-T SG 16 WP 3 and ISO/IEC JTC 1/SC 29/WG 11, 14th Meeting, Geneva, CH, Mar. 2019, Document: JVET-N0384.

EXTENDING SEARCH RANGE FOR REFERENCE BLOCKS BEYOND CURRENT CTU

INCORPORATION BY REFERENCE

The present application is a continuation of U.S. application Ser. No. 17/943,671, "EXTENSION OF EFFECTIVE SEARCH RANGE FOR CURRENT PICTURE REFERENCING" filed on Sep. 13, 2022, which is a continuation of U.S. application Ser. No. 17/306,639, "METHOD AND APPARATUS FOR REFERENCE SAMPLE MEMORY REUSE FOR INTRA PICTURE BLOCK COMPENSATION" filed on May 3, 2021, now U.S. Pat. No. 11,483,581, which is a continuation of and claims priority to U.S. patent application Ser. No. 16/880,578, "METHOD AND APPARATUS FOR REFERENCE SAMPLE MEMORY REUSE FOR INTRA PICTURE BLOCK COMPENSATION" filed on May 21, 2020, now U.S. Pat. No. 11,039,158, which is a continuation of and claims priority to U.S. patent application Ser. No. 16/502,822, "METHOD AND APPARATUS FOR REFERENCE SAMPLE MEMORY REUSE FOR INTRA PICTURE BLOCK COMPENSATION" filed on Jul. 3, 2019, now U.S. Pat. No. 10,701,385, which claims the benefit of priority to U.S. Provisional Application No. 62/791,862, "REFERENCE SAMPLE MEMORY REUSE FOR INTRA PICTURE BLOCK COMPENSATION," filed on Jan. 13, 2019. The benefit of priority is claimed to each of the foregoing, and the entire contents of each of the foregoing are incorporated herein by reference.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

When a current block is decoded using intra block copy, a memory is referenced to retrieve samples for decoding the current block. Since the size the memory is constrained, portions of the memory are overwritten when memory is updated with samples from recently decoded blocks. According new methods are needed to efficiently utilize memory to perform intra block copy.

SUMMARY

According to an exemplary embodiment of the present disclosure, a method of video decoding for a decoder includes receiving a coded video bitstream. The method further includes determining whether a reference block for a current block is located in a different coding tree unit (CTU)

than a CTU of the current block, the reference block and current block located in a same picture included in the coded video bitstream. The method further includes, in response to the determination that the reference block is located in the different CTU, determining whether the CTU of the current block and a reference sample memory have a same size. The method further includes, in response to the determination that the CTU of the current block and reference sample memory have a same size: (i) determining a first area in the CTU of the current block that is collocated with a second area in the different CTU, the first area having position coordinates in the CTU of the current block that is the same as position coordinates of the second area in the different CTU of the reference block; (ii) determining, based on a decoding status of the first area, whether a memory location of the reference sample memory for the reference block is available; and (iii) in response to the determination that the memory location for the reference block is available, retrieving, from the memory location corresponding to the reference block, one or more samples to decode the current block.

According to an exemplary embodiment of the present disclosure, a video decoder for video decoding includes processing circuitry. The processing circuitry is configured to receive a coded video bitstream. The processing circuitry is further configured to determine whether a reference block for a current block is located in a different coding tree unit (CTU) than a CTU of the current block, the reference block and current block located in a same picture included in the coded video bitstream. The processing circuitry is further configured to, in response to the determination that the reference block is located in the different CTU, determine whether the CTU of the current block and a reference sample memory have a same size. The processing circuitry is further configured to, in response to the determination that the CTU of the current block and reference sample memory have a same size: (i) determine a first area in the CTU of the current block that is collocated with a second area in the different CTU, the first area having position coordinates in the CTU of the current block that is the same as position coordinates of the second area in the different CTU of the reference block, (ii) determine, based on a decoding status of the first area, whether a memory location of the reference sample memory for the reference block is available, and (iii) in response to the determination that the memory location for the reference block is available, retrieving, from the memory location corresponding to the reference block, one or more samples to decode the current block.

According to an exemplary embodiment of the present disclosure, a non-transitory computer readable medium having instructions stored therein, which when executed by a processor in a video decoder causes the video decoder to execute a method. The method includes receiving a coded video bitstream. The method further includes determining whether a reference block for a current block is located in a different coding tree unit (CTU) than a CTU of the current block, the reference block and current block located in a same picture included in the coded video bitstream. The method further includes, in response to the determination that the reference block is located in the different CTU, determining whether the CTU of the current block and a reference sample memory have a same size. The method further includes, in response to the determination that the CTU of the current block and reference sample memory have a same size: (i) determining a first area in the CTU of the current block that is collocated with a second area in the different CTU, the first area having position coordinates in the CTU of the current block that is the same as position coordinates of the second area in the different CTU of the reference block; (ii) determining, based on a decoding status of the first area, whether a memory location of the reference sample memory for the reference block is available; and (iii) in response to the determination that the memory location for the reference block is available, retrieving, from the memory location corresponding to the reference block, one or more samples to decode the current block.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
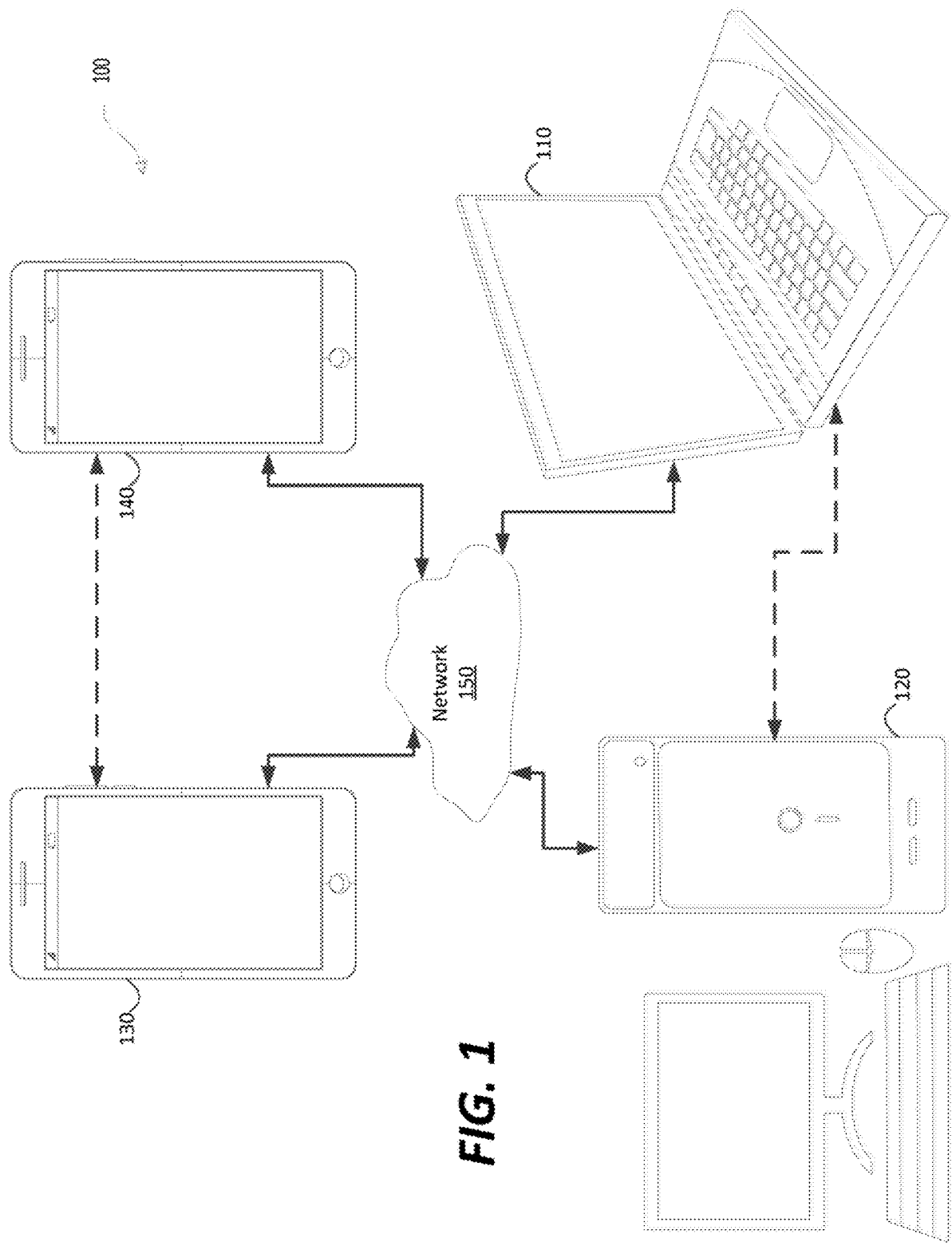
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
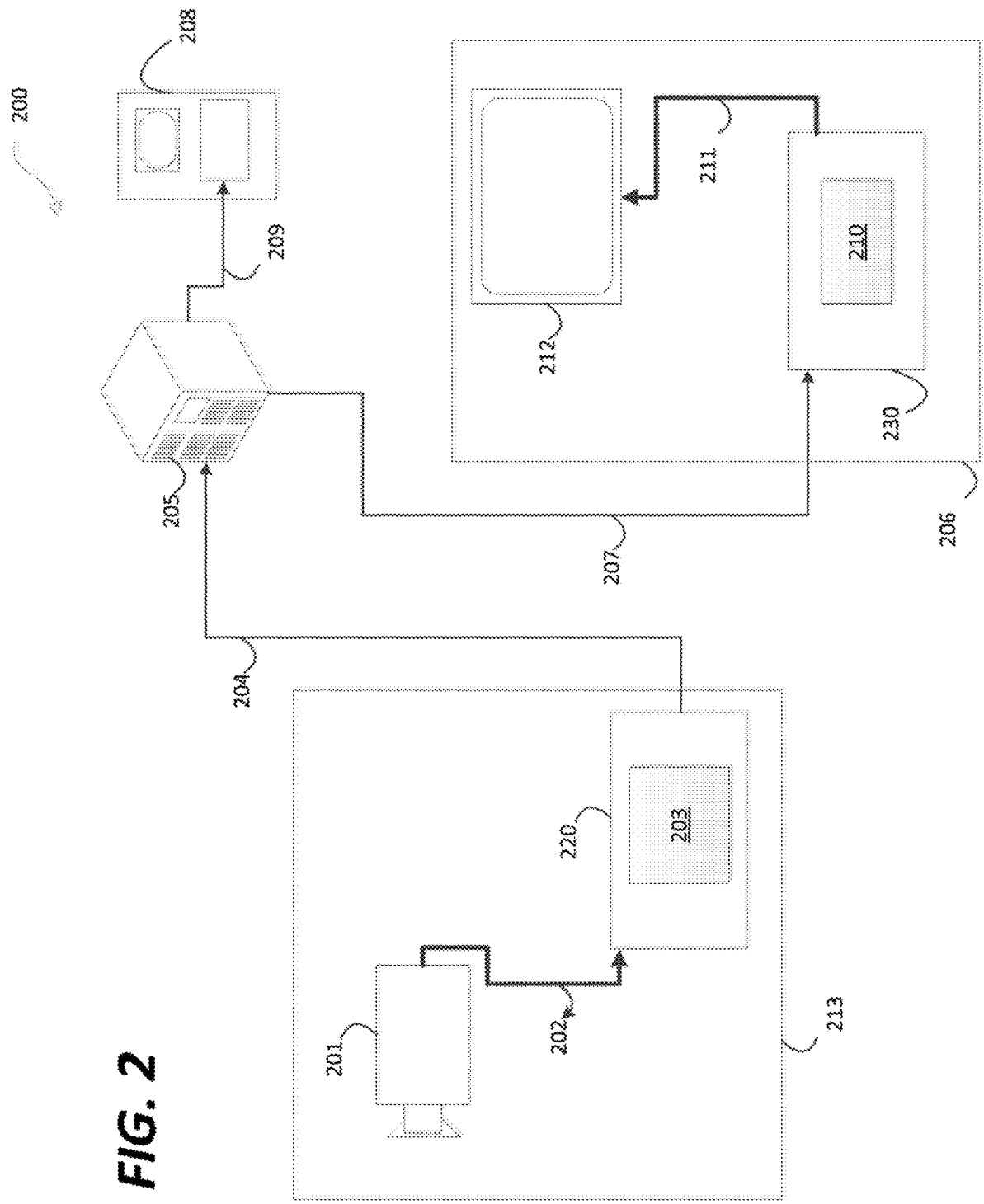
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
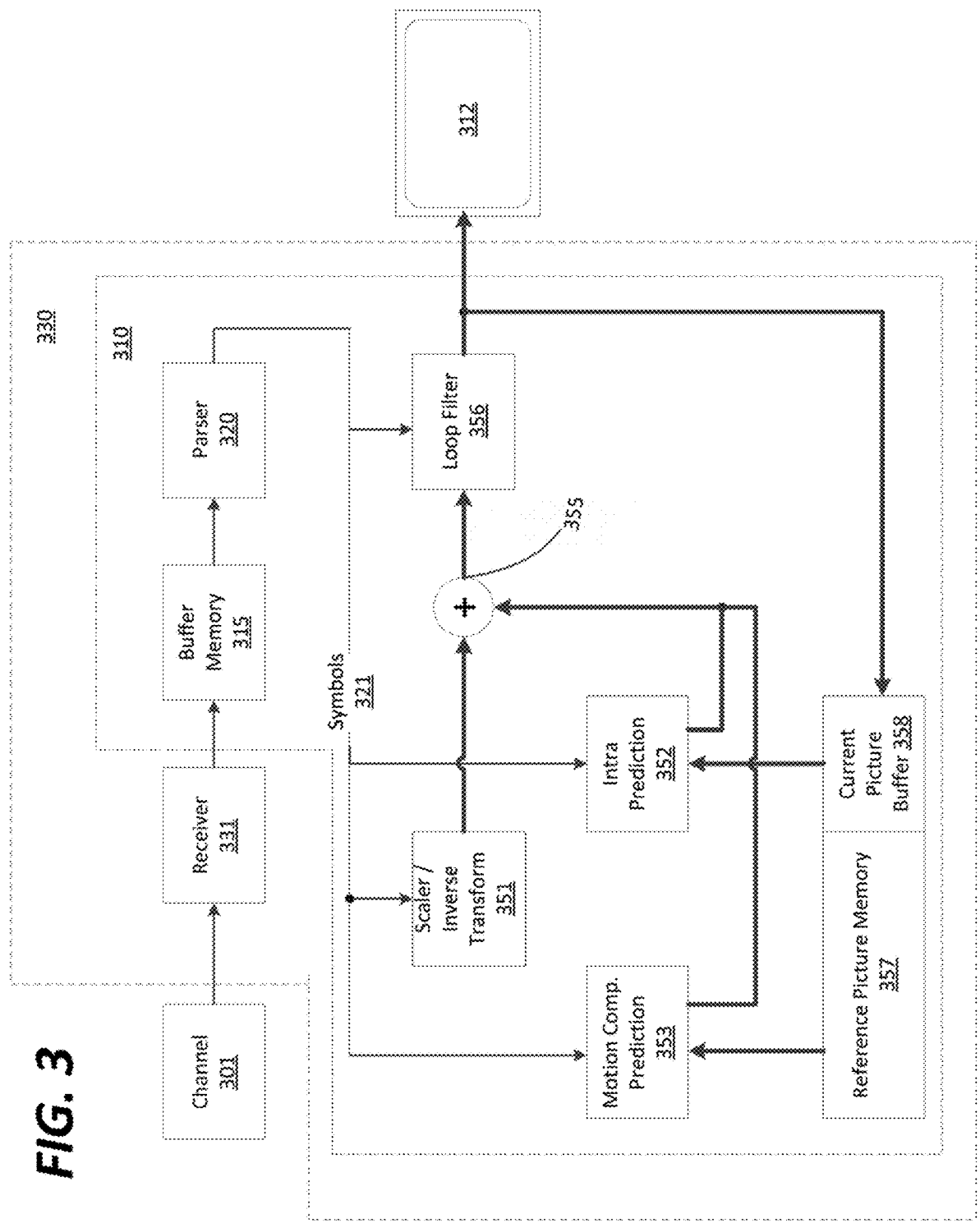
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
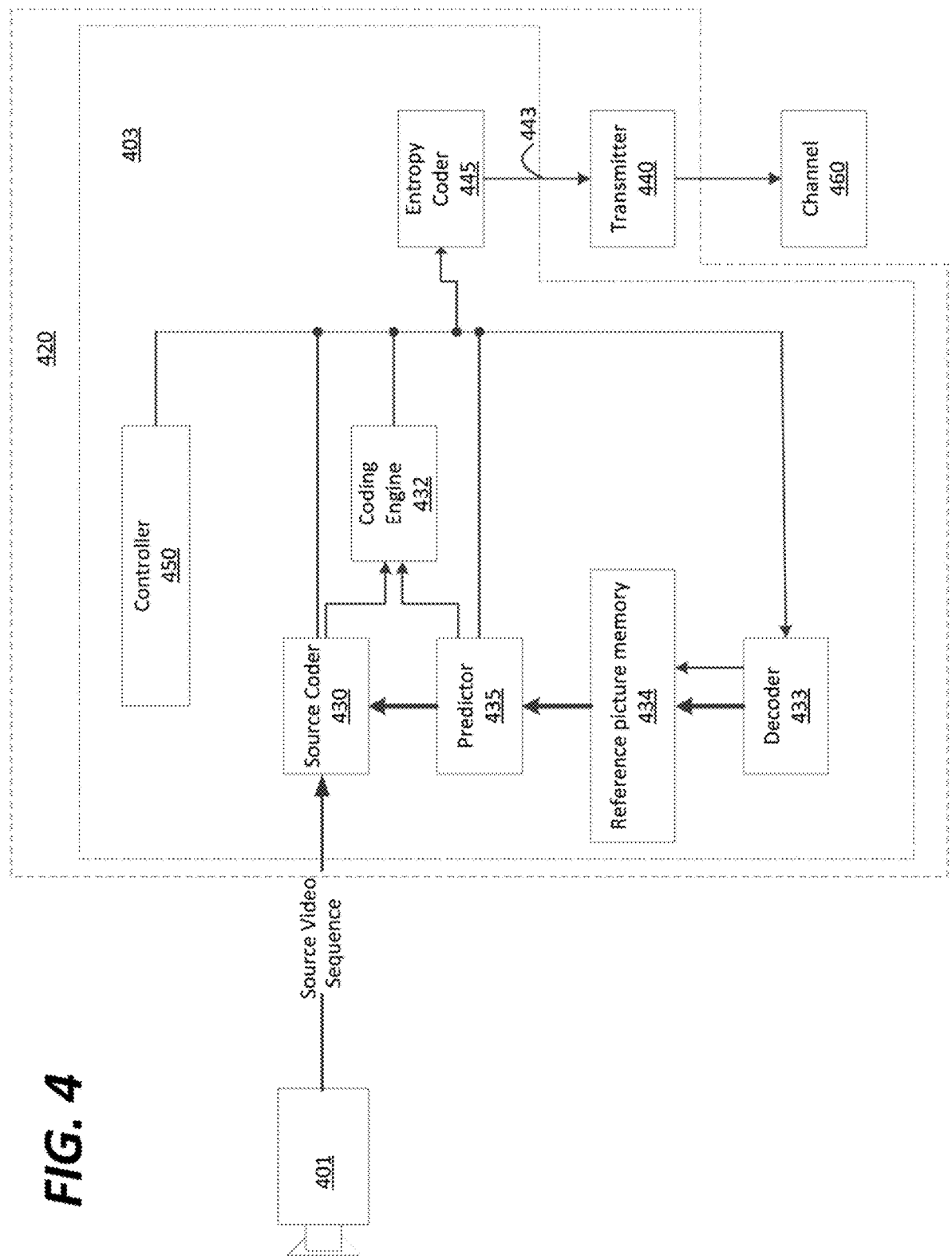
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by losslessly compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
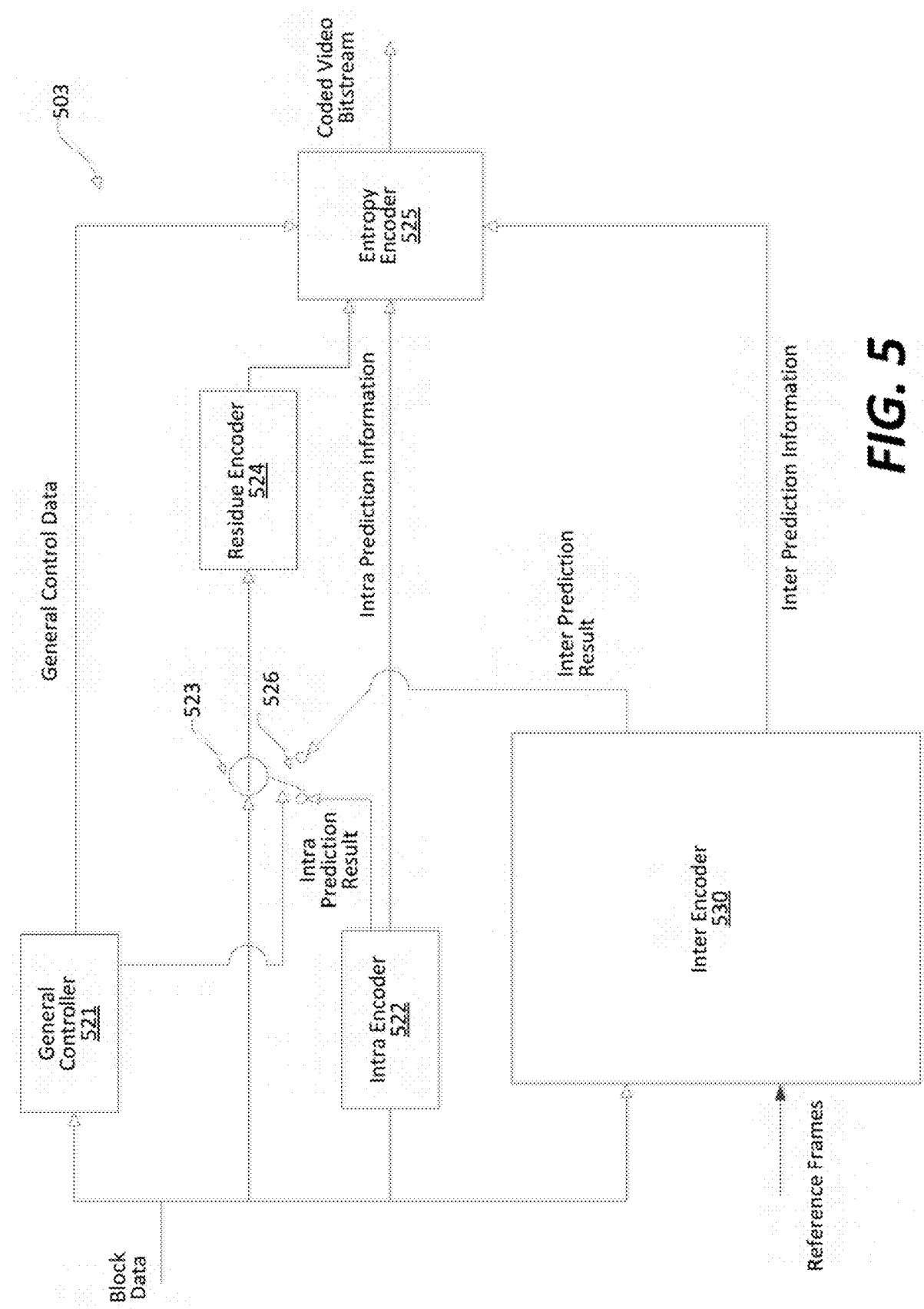
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
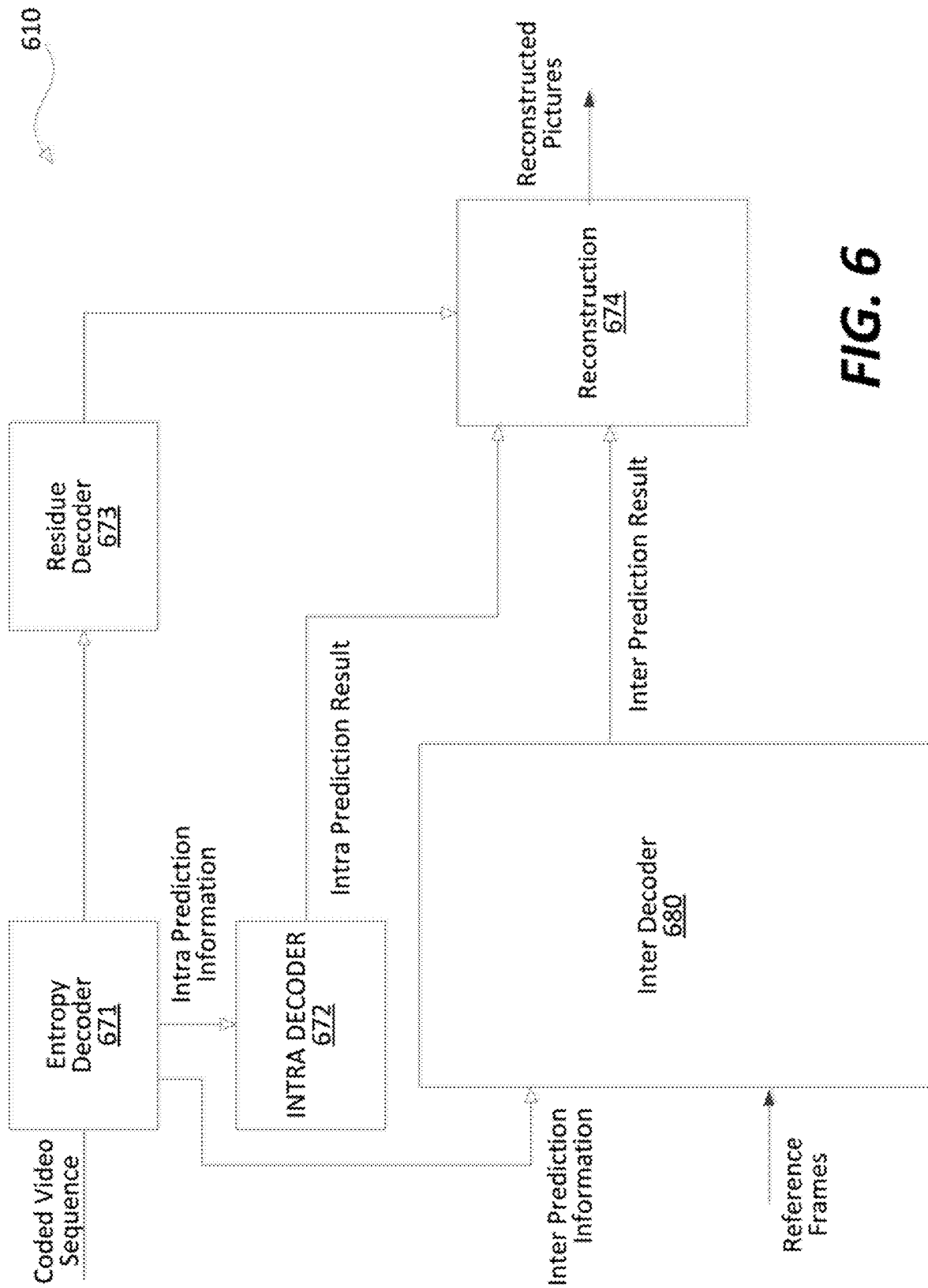
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Figure 7:
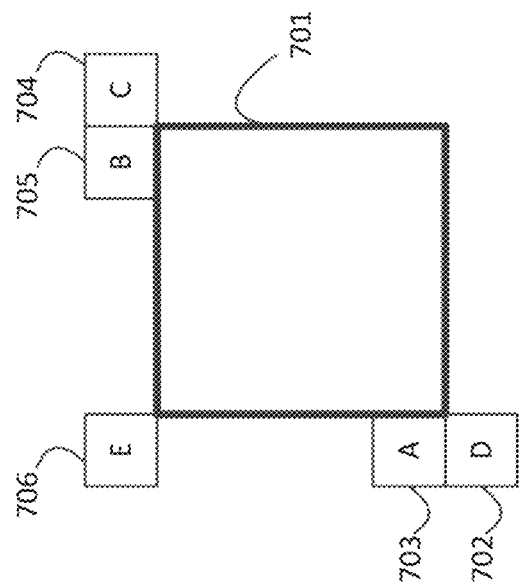
FIG. 7 is a schematic illustration of a current block and its surrounding spatial merge candidates in one example.

Merge candidates may be formed by checking motion information from either spatial or temporal neighbouring blocks of the current block. Referring to FIG. 7, a current block (701) comprises samples that have been found by the encoder/decoder during the motion search process to be predictable from a previous block of the same size that has been spatially shifted. In some embodiments, instead of coding that motion vector directly, the motion vector can be derived from metadata associated with one or more reference pictures, for example, from a most recent (in decoding order) reference picture, using the motion vector associated with either one of five surrounding samples, denoted D, A, C, B, and E (702 through 706, respectively). The blocks A, B, C, D, and E may be referred to as spatial merge candidates. These candidates may be sequentially checked into a merge candidate list. A pruning operation may be performed to make sure duplicated candidates are removed from the list.

Block based compensation from a different picture may be referred to as motion compensation. Block compensation may also be done from a previously reconstructed area within the same picture, which may be referred to as intra picture block compensation, intra block copy (IBC), or current picture referencing (CPR). For example, a displacement vector that indicates an offset between a current block and the reference block is referred to as a block vector. According to some embodiments, a block vector points to a reference block that is already reconstructed and available for reference. Also, for parallel processing consideration, a reference area that is beyond a tile/slice boundary or wavefront ladder-shaped boundary may also be excluded from being referenced by the block vector. Due to these constraints, a block vector may be different from a motion vector in motion compensation, where the motion vector can be at any value (positive or negative, at either x or y direction).

The coding of a block vector may be either explicit or implicit. In an explicit mode, which is sometimes referred to as (Advanced Motion Vector Prediction) AMVP mode in inter coding, the difference between a block vector and its predictor is signaled. In the implicit mode, the block vector is recovered from the block vector's predictor, in a similar way as a motion vector in merge mode. The resolution of a block vector, in some embodiments, is restricted to integer positions. In other embodiments, the resolution of a block vector may be allowed to point to fractional positions.

The use of intra block copy at the block level may be signaled using a block level flag, referred to as an IBC flag. In one embodiment, the IBC flag is signaled when a current block is not coded in merge mode. The IBC flag may also be signaled by a reference index approach, which is performed by treating the current decoded picture as a reference picture. In HEVC Screen Content Coding (SCC), such a reference picture is put in the last position of the list. This special reference picture may also be managed together with other temporal reference pictures in the DPB. IBC may also include variations such as flipped IBC (e.g., the reference block is flipped horizontally or vertically before used to predict current block), or line based (IBC) (e.g., each compensation unit inside an M×N coding block is an M×1 or 1×N line).

Figure 8:
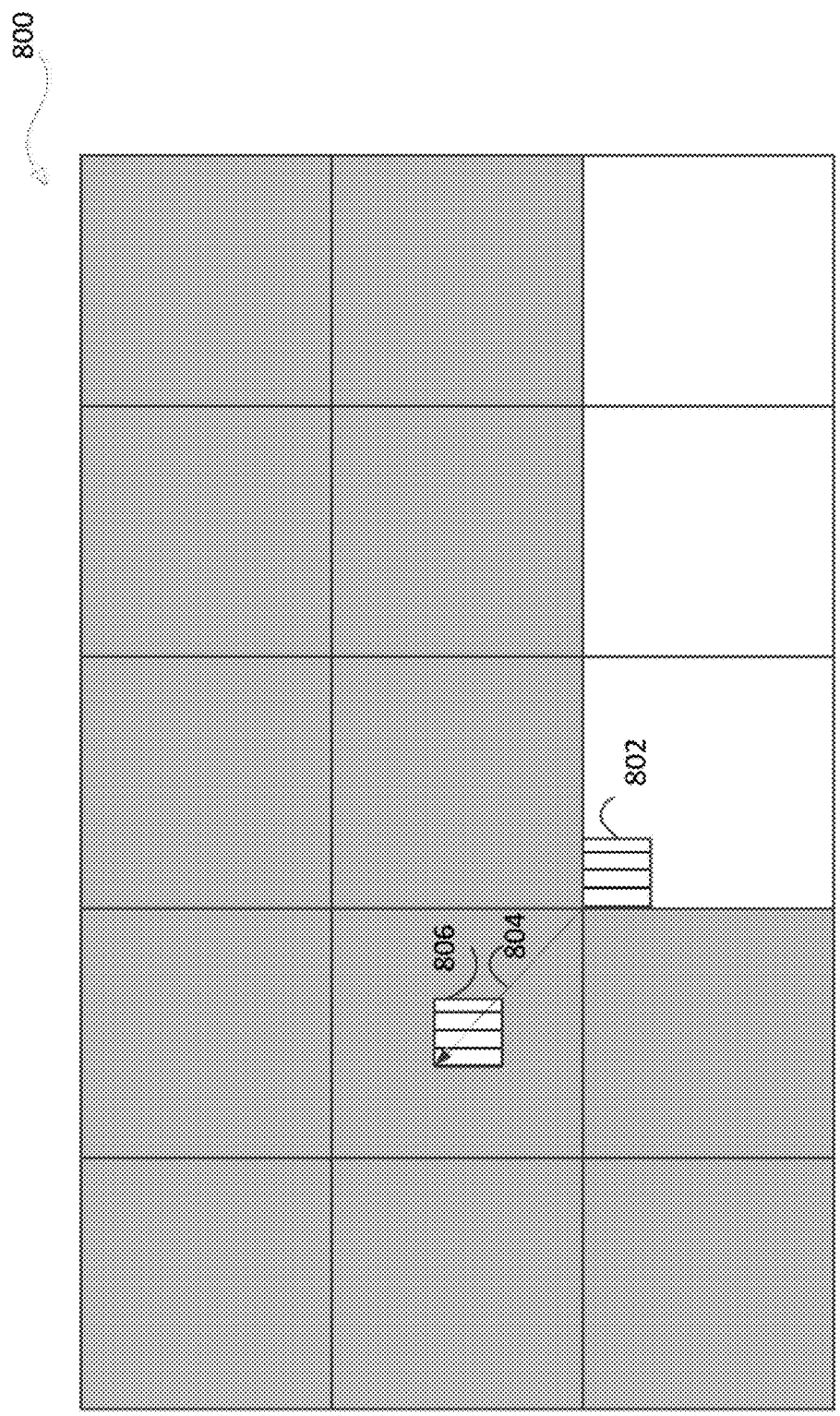
FIG. 8 is a schematic illustration of intra picture block compensation.

FIG. 8 illustrates an embodiment of intra picture block compensation (e.g., intra block copy mode). In FIG. 8, a current picture 800 includes a set of block regions that have already been coded/decoded (i.e., gray colored squares) and a set of block regions that have yet to be coded/decoded (i.e., white colored squares). A block 802 of one of the block regions that have yet to be coded/decoded may be associated with a block vector 804 that points to another block 806 that has previously been coded/decoded. Accordingly, any motion information associated with the block 806 may be used for the coding/decoding of block 802.

In some embodiments, the search range of the CPR mode is constrained to be within the current CTU. The effective memory requirement to store reference samples for CPR mode is 1 CTU size of samples. Taking into account the existing reference sample memory to store reconstructed samples in a current 64×64 region, 3 more 64×64 sized reference sample memory are required. Embodiments of the present disclosure extend the effective search range of the CPR mode to some part of the left CTU while the total memory requirement for storing reference pixels are kept unchanged (1 CTU size, 4 64×64 reference sample memory in total).

FIGS. 9A-9D illustrate example CTUs 900 and 902, each with four regions. The CTU 902 is to the left of CTU 900, with each of the four regions of CTU 902 having been previously decoded. FIGS. 10A-10D illustrate an embodiment of a reference sample memory with entries [1]-[4], corresponding to a size of one CTU. The reference sample memory may store reference samples of previously decoded CTUs for future IBC reference. For example, when the CTU 902 is decoded, the reference sample memory entries [1]-[4] are filled with samples from the four regions of CTU 902, with entry [1] corresponding to the upper left region, entry [2] corresponding to the upper right region, entry [3] corresponding to the lower left region, and entry [4] corresponding to the upper right region. When an entry of the reference sample memory is filled, that entry then contains samples available for future IBC reference.

Figure 9A:
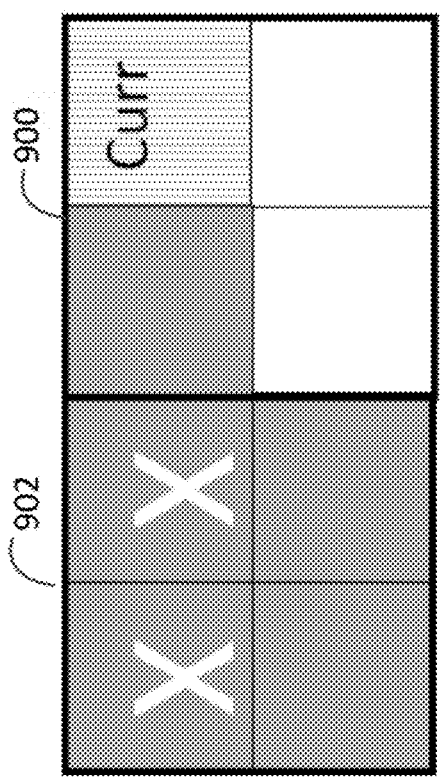
FIGS. 9A-9D is a schematic illustration of intra picture block compensation with one coding tree unit (CTU) size search range.
Figure 9B:
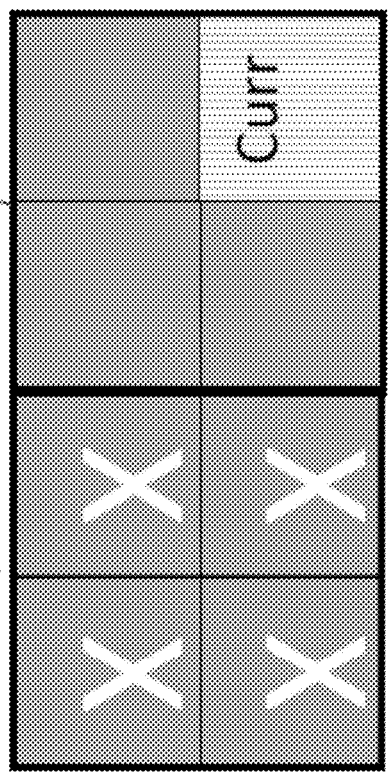
Figure 9C:
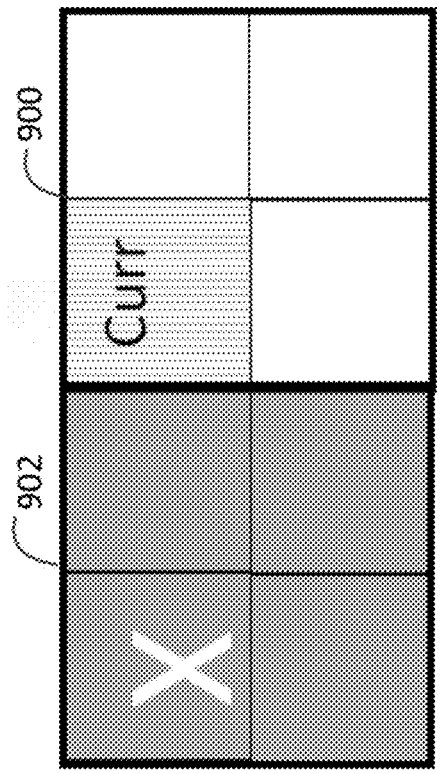
Figure 9D:
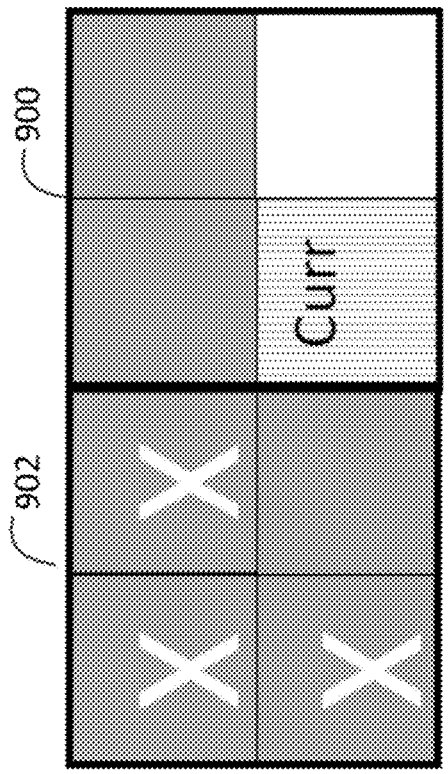
Figure 10A:
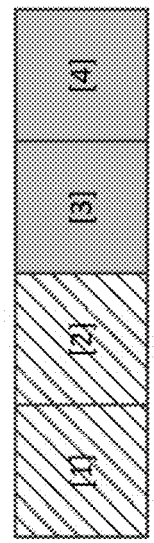
FIGS. 10A-10D is a schematic illustration of a reference sample memory.
Figure 10B:
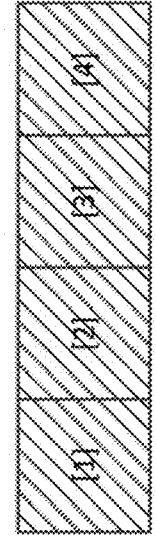
Figure 10C:
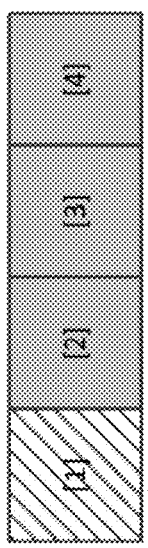
Figure 10D:
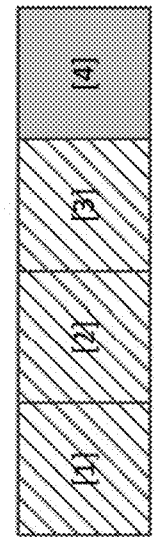

In FIG. 9A, the upper left region of CTU 900 is the current region being decoded. When the upper left region of CTU 900 is decoded, the entry [1] of the reference sample memory is overwritten with the samples from this region, as illustrated in FIG. 10A (e.g., over-written memory location(s) has diagonal cross-hatching). In FIG. 9B, the upper right region of CTU 900 is the next current region being decoded. When the upper right region of CTU 900 is decoded, the entry [2] of the reference sample memory is overwritten with the samples from this region, as illustrated in FIG. 10B. In FIG. 9C, the lower left region of CTU 900 is the next current region being decoded. When the lower left region of CTU 900 is decoded, the entry [3] of the reference sample memory is overwritten with the samples from this region, as illustrated in FIG. 10C. In FIG. 9D, the lower right region of CTU 900 is the next current region being decoded. When the lower right region of CTU 900 is decoded, the entry [3] of the reference sample memory is overwritten with the samples from this region, as illustrated in FIG. 10D.

The embodiments of the present disclosure improve IBC performance under certain reference area constraints, such as when the size of the reference sample memory is constrained. In some embodiments, the size of reference sample memory is constrained to 128×128 luma samples (plus corresponding chroma samples). In an example, one CTU size of reference samples is considered as the designated memory size. Additional examples include different memory sizes/CTU sizes combinations, such as 64×64 luma samples (plus corresponding chroma samples) for the CTU size and 128×128 luma sample (plus corresponding chroma samples) for the memory size, etc.

Figure 11:
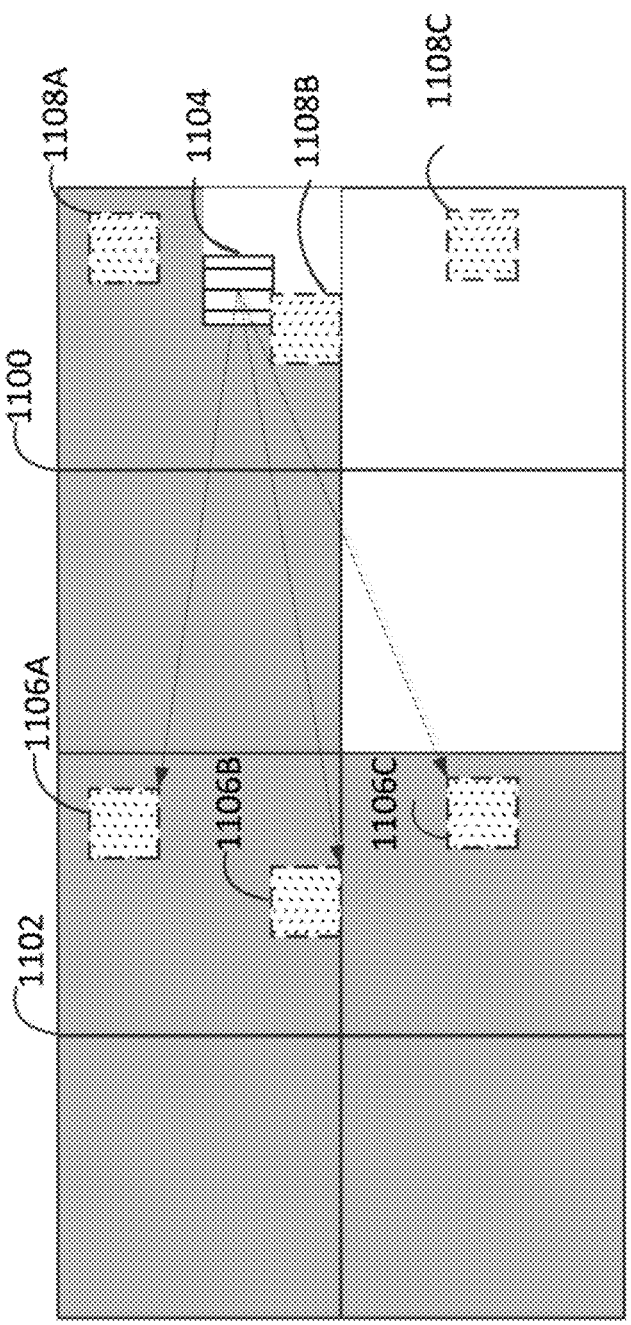
FIG. 11 is a schematic illustration of reference blocks in a first CTU and corresponding collocated blocks in a second CTU.

FIG. 11 illustrates example CTUs 1100 and 1102. As illustrated in FIG. 11, CTU 1102 is to the left of CTU 1100 and includes four previously decoded regions. CTU 1100 is the current CTU being decoded, with the upper left region already decoded. The upper right region of CTU 1100 is the current region being decoded, with block 1104 being the current block of the upper right region being decoded. The block 1104 may have three reference blocks 1106A-1106C. As illustrated in FIG. 11, each of the reference blocks 1106A-1106C are located in the CTU 902, which is to the left of CTU 1100. Each of blocks 1106A-1106C have collocated blocks 1108A-1108C, respectively, in CTU 900.

According to some embodiments, a collocated block refers to a pair of blocks that have the same size with one block in the previously coded CTU and the other block in the current CTU. For example, if the memory buffer size is one CTU, then the previous CTU means the CTU that has one CTU width luma sample offset to the left of the current CTU. In addition, these two blocks have the same location offset values relative to the top-left corner of their own CTU, respectively. In this regard, a pair of collocated blocks are those two blocks that have the same y coordinate relative to the top-left corner of a picture, but with a CTU width difference in x coordinates to one another (i.e., two collocated blocks have the same position coordinates in each respective CTU). For example, in FIG. 11, reference block 1106A and its collocated block 1108A have the same x,y coordinates in CTU 1102 and 1100, respectively. Similarly, reference block 1106B and its collocated block 1108B have the same x,y coordinates in CTU 1102 and 1100, respectively. Additionally, reference block 1106C and its collocated block 1108C have the same x,y coordinates in CTU 1102 and 1100, respectively.

In FIG. 11, it is assumed that the size of the reference sample memory is one CTU. Accordingly, reference block 1106C can be found in the reference sample memory because the corresponding collocated block 1108C in the current CTU has not yet been decoded, which is demonstrated by the collocated block 1108C being located in the white area. Therefore, the location in the reference sample memory corresponding to reference block 1106 still stores the reference samples from the left CTU.

In contrast to reference block 1106C, the reference block 1106A cannot be used since the corresponding collocated block 1108A in CTU 1100 has been reconstructed (i.e., decoded), which is demonstrated by collocated block 1108A being located in the grey area. Therefore, the location in the reference sample memory for reference block 1106A has been updated with the reference samples from the CTU 900, and thus, is no longer available. Similarly, reference block 1106B is not a valid reference block to be used for decoding because part of the corresponding collocated block 1108B in CTU 900 has been reconstructed, and therefore, the location in the reference sample memory corresponding to reference block 1106B has been updated with the data in CTU 900.

According to some embodiments, a reference block in the previously decoded CTU is available to use for IBC reference if the reference block's corresponding collocated block in the current CTU has not yet been reconstructed. In some embodiments, the reference block's top-left corner sample's collocated sample in the current CTU is checked. If the collocated sample in the current CTU has not yet been reconstructed, the rest of that reference block is available for IBC reference. In some embodiments, if the memory size is 1 CTU, then referring to the previous decoded CTU means referring to the CTU immediate to the left of current CTU.

Figure 12:
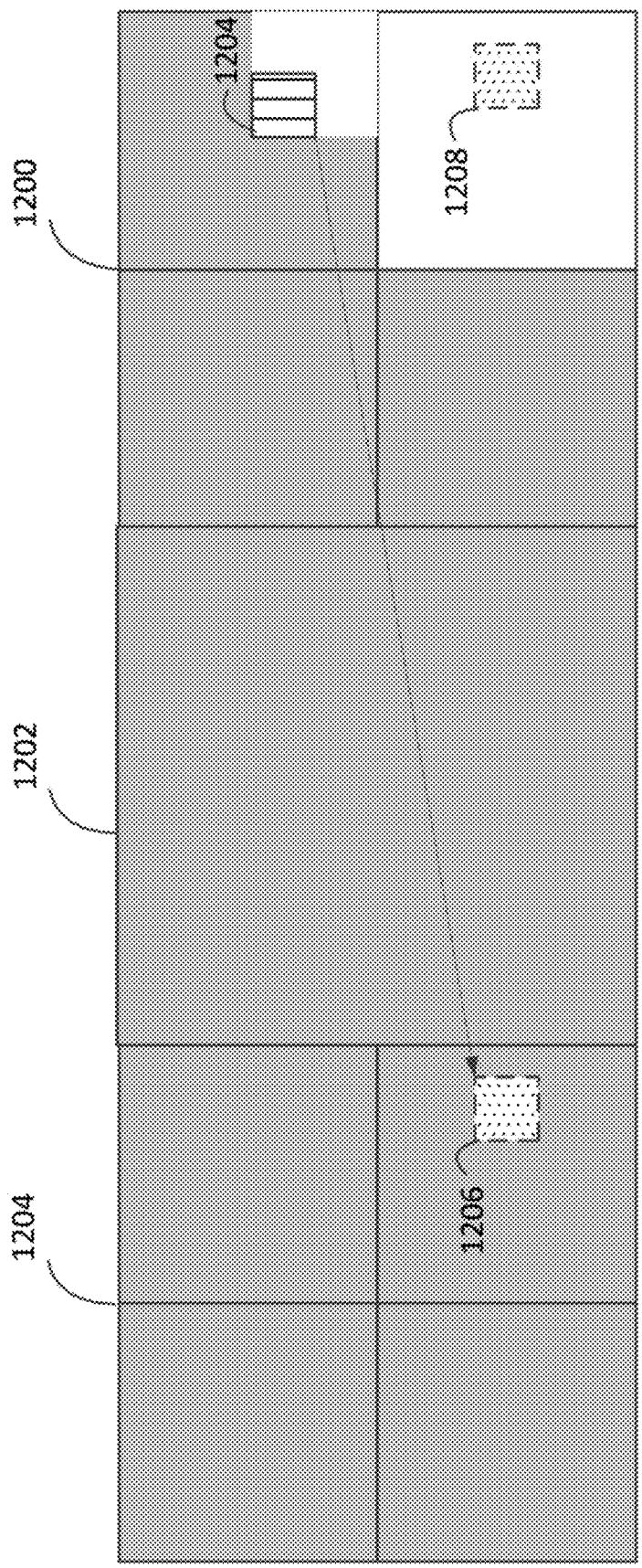
FIG. 12 is a schematic illustration of reference blocks in a first CTU and corresponding collocated blocks in a second CTU with a third CTU between the first and second CTUs.

If the memory size is larger than a CTU (e.g., 2 CTU sizes of reference sample memory is allowed), then the previous coded CTU refers to the CTU to the left of the current CTU's left CTU, as illustrated in FIG. 12. For example, in FIG. 12, CTU 1200 is the current CTU being decoded, and CTUs 1202 and 1204 are two previously decoded CTUs to the left of CTU 1200. Block 1204 is the current block being decoded, and reference block 1206 is the reference block for current block 1204. Furthermore, block 1208 collocated to block 1206. However, in this example, the x coordinate offset between blocks 1206 and 1208 is two times the CTU width.

According to some embodiments, the following conditions are true:

$$(yCb+(mvL0[1]>>4))>>Ctb \text{ Log } 2SizeY = yCb>>Ctb \text{ Log } 2SizeY \quad \text{Eq. 1:}$$

$$(yCb+(mvL0[1]>>4)+cbHeight-1)>>Ctb \text{ Log } 2SizeY = yCb>>Ctb \text{ Log } 2SizeY \quad \text{Eq. 2:}$$

$$(xCb+(mvL0[0]>>4))>>Ctb \text{ Log } 2SizeY >= (xCb>>Ctb \text{ Log } 2SizeY)-1 \quad \text{Eq. 3:}$$

$$(xCb+(mvL0[0]>>4)+cbWidth-1)>>Ctb \text{ Log } 2SizeY >= (xCb>>Ctb \text{ Log } 2SizeY)-1 \quad \text{Eq. 4:}$$

Eqs. 1-4 may be used to locate a reference block. Eqs. 1 and 2 mean that the top and bottom of the reference block should be inside the same CTU row. Eqs. 3 and 4 mean that the left and right side of the reference block should be in the current or left CTU. In the above equations, xCb and yCb are the x and y coordinates of the current block, respectively. The variables cbHeight and cbWidth are the height and width of the current block, respectively. The variable CtbLog 2sizeY refers to the CTU size in the log 2 domain.

For example, CtbLog 2sizeY=7 means that the CTU size is 128×128. The variables mvL0[0] and mvL0[1] refer to the x and y components of block vector mvL0, respectively.

According to some embodiments, when it is determined that a reference block of a current block is in a different CTU than a current CTU of the current block, the reference sample memory is checked to determine if the samples corresponding to the reference block is available. In some embodiments, determining whether the reference block is in a different CTU than the current CTU is determined as follows:

$$(xCb+(mvL[0]\!>\!>\!4))\!>\!>\!Ctb \text{ Log } 2SizeY\!=\!(xCb\!>\!>\!Ctb \text{ Log } 2SizeY)-1 \quad \text{Eq. 5:}$$

When the reference block of a current block is in a different CTU than the CTU of the current block, determining whether samples for the reference block are available in the reference memory are determined, according to some embodiments, using as inputs:
 (i) the x and y coordinates of the current block (xCb, yCb); and
 (ii) the neighboring luma location ((xCb+(mvL[0]>>>4)+(1<<CtbLog 2SizeY), yCb+(mvL0[1]>>4)), If the output is FALSE, the samples for the reference block are determined to be available. For example, for a current block at current position (Cbx, Cby), inputs (i) and (ii) are used to determine whether a neighboring block (Nbx, Nby) is available to the current block. Available means that a block is already decoded, and can be used for intra prediction (e.g., inside the same tile)

According to some embodiments, when the reference block of a current block is in a different CTU than the CTU of the current block, a $2^M \times 2^N$ region is checked to determine whether samples for the reference block are available in the reference sample memory. M and N may be positive integers. Determining whether the $2^M \times 2^N$ region is available in the reference memory is determined, according to some embodiments, using as inputs:
 (i) the x and y coordinates of the current block (xCb, yCb); and
 (ii) the neighbouring luma location (((xCb+(mvL[0]>>4)+(1<<CtbLog 2SizeY))>>(CtbLog 2SizeY−1))<<(CtbLog 2SizeY−1), ((yCb+(mvL0[1]>>4))>>(CtbLog 2SizeY−1))<<(CtbLog 2SizeY−1))

If the output is FALSE, the samples for the reference block are determined to be available (e.g., a neighboring block is available for intra block copy usage). For example, if M and N are equal to 8, if any sample of a 64×64 region in the current CTU (referred as current sample) has been reconstructed, the corresponding 64×64 region in the reference sample memory where the current sample's collocated sample is located will not be available for IBC reference. As such, the reference sample memory may be updated on a 64×64 basis.

In some embodiments, the CTUs in a picture have variable sizes with differences in width or height being doubled or reduced by half. When the CTU size is reduced by half, the reference sample memory that previously stored 1 CTU now stores 4 CTUs. Therefore, there will be four CTUs to the left of the current CTU, instead of two CTUs on the left of current CTU, as shown in FIG. 12. In these scenarios, 4 CTUs of reference data or 2 CTUs of reference data, except in the left most CTU, all other previous coded samples in the other CTUs to the left of current CTU are fully available without using the condition checks in the above embodiments. For the left most CTU, the condition checks in the above embodiments are similar for the reference samples' availability, but the adjustment of the x coordinate offset is 2*CTU width when there are two CTUs for the left most CTU, and 4*CTU width when there are four CTUS for the left most CTU.

Figure 13:
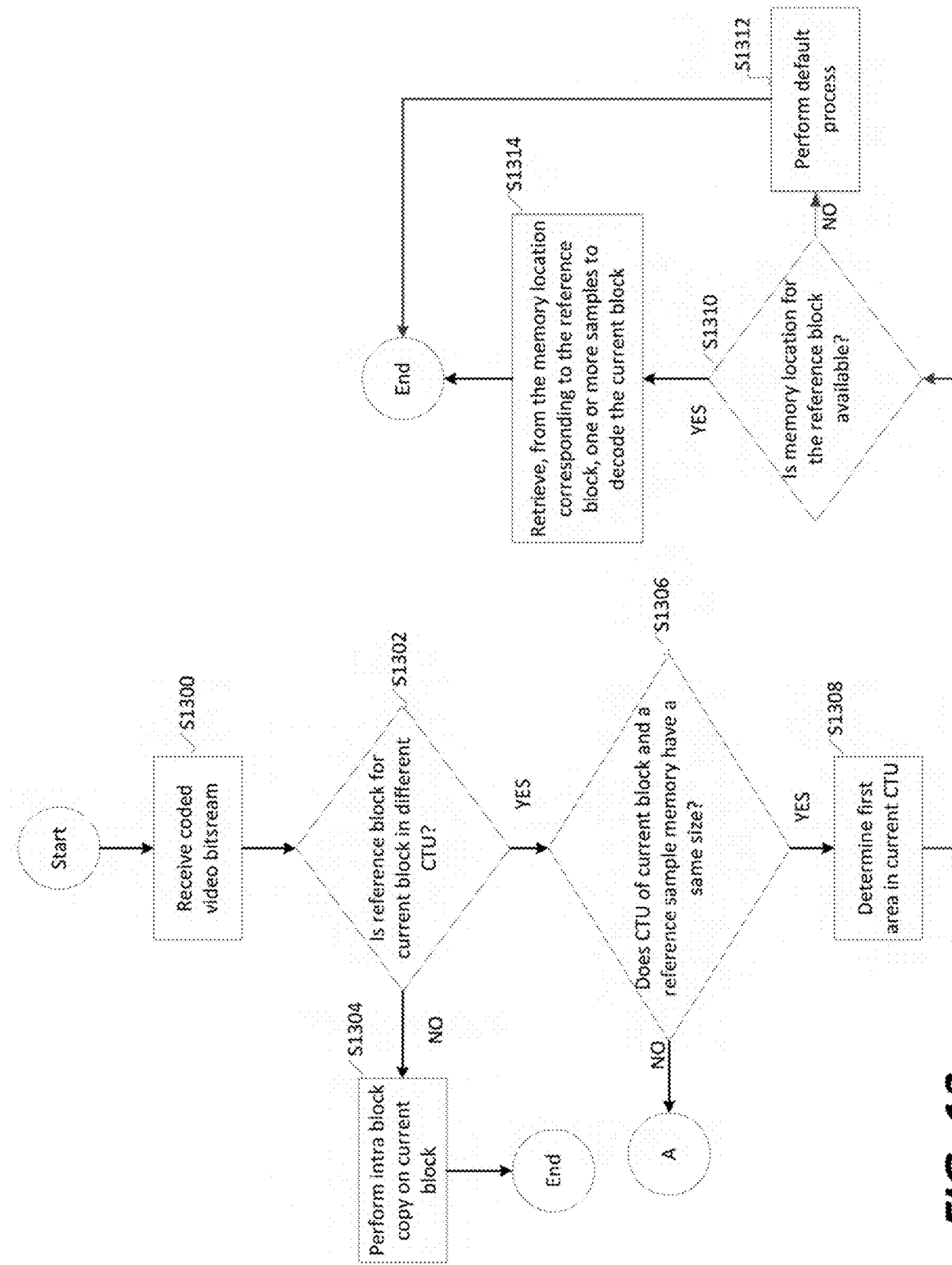
FIGS. 13 and 14 illustrate an embodiment of a process performed by an encoder.
Figure 14:
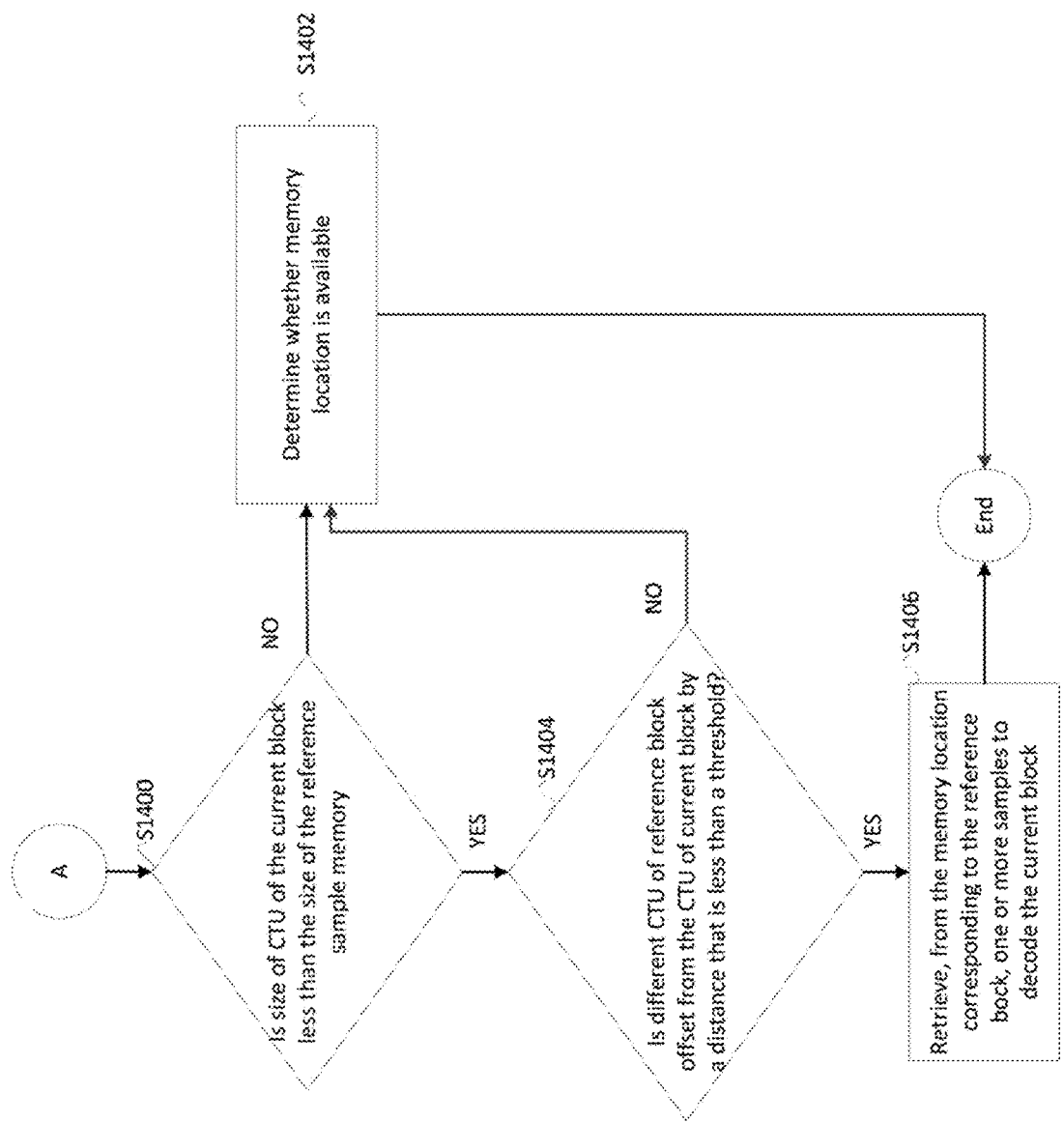

FIGS. 13 and 14 illustrate an embodiment of a process used in the reconstruction of a block coded in intra mode, so to generate a prediction block for the block under reconstruction. In various embodiments, the process is executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the intra prediction module (352), the processing circuitry that performs functions of the video encoder (403), the processing circuitry that performs functions of the predictor (435), the processing circuitry that performs functions of the intra encoder (522), the processing circuitry that performs functions of the intra decoder (672), and the like. In some embodiments, the process is implemented in software instructions, thus when the processing circuitry executes the software instructions, the processing circuitry performs the process.

The process may generally start at step S1300 where a coded video bitstream is received. The process proceeds to step S1302 where it is determined if a reference block for the current block is in a different CTU than a current CTU for the current block. If it is determined that the reference block is not in the different CTU, the process proceeds to step S1304 where IBC is performed on the current block using the reference block.

If it is determined that the reference block is in a different CTU, the process proceeds from step S1302 to step S1306 where it is determined if the CTU of the current block and a reference sample memory have the same size. If the CTU of the current block and the reference sample memory are not the same in size, the process proceeds to process A, which is described in further detail below. If CTU of the current block and the reference sample memory are the same in size, the process proceeds to step S1308 where a first area is determined for the current CTU. As an example, the first area may be a block that is collocated with a reference block, or a $2^M \times 2^N$ region, where M and N are positive integers.

The process proceeds to step S1310 where it is determined whether the memory location for the reference block is available. For example, the first area, located in the current CTU, may be collocated with a second area in the different CTU, in which the second area includes the reference block. If first area has been at least partially reconstructed, it is determined that the memory location for the reference block in the reference sample memory is not available. If it is determined that the memory location in the reference sample memory for the reference block is unavailable, the process proceeds to step S1312 where a default process is performed such as selecting another reference block. In another method, if it is determined that the memory location in the reference sample memory for the reference block is unavailable, the default process can be putting a predefined value to form a reference block for the current block, such as 1<<(bit_depth−1), where bit_depth is the depth of the bits used per sample. If the memory location in the reference sample memory for the reference block is available, the process proceeds from step S1310 to step S1314 where one or more samples are retrieved from the memory location corresponding to the reference block to decode the current block.

Process A may generally start at step S1400 where it is determined whether the size of the CTU of the current block is less than the size of the reference sample memory. If the size of the CTU of the current block is less than the size of the reference sample memory, the process proceeds to step S1402 to determine whether the memory location corresponding to the reference block in the reference sample memory is performed. For example, steps S1308-S1312 may be repeated at step S1402 as described above.

If at step S1400 it is determined that the size of the CTU of the current block is less than the size of the reference sample memory, the process proceeds to step S1404 where it is determined if the distance between the different CTU where the reference block is located and current CTU where the current block is located is less than a threshold. As an example, the distance between the reference block and the current block may be determined based on a difference between the X-coordinates of these blocks. As an example, the threshold may be defined as:

((reference sample memory size/CTU size)−1)*(CTU width).

If the distance between the different CTU of the reference block and the CTU of the current block is less than the threshold, the process proceeds to step S1406, to retrieve, from the memory location corresponding to the reference bock, one or more samples to decode the current block. In this regard, when the distance between the reference block of the different CTU and the current block is less than the threshold, the memory check described in steps S1308-S1312 in FIG. 13 are not performed. If the distance between the reference block of the different CTU and the current block is greater than or equal to the threshold, the process returns from step S1404 to step S1402. The process illustrated in FIG. 14 ends after steps S1402 or S1404.

The scenarios in FIG. 14 are depicted in FIG. 12 where the size of the reference sample memory is two times larger than the size of the current CTU. If the reference block is located in CTU 1202, the distance between the CTU 1202 and the current CTU will be less than the threshold. Therefore, in this scenario, the memory location in the reference sample memory corresponding to the reference block will be available, and thus, performing a memory check of the reference sample memory is not necessary. If the reference block is located in CTU 1204, the distance between the CTU 1204 and the current CTU will be greater than or equal to the threshold. Therefore, in this scenario, the memory check described in steps S1308-S1312 in FIG. 13 is performed to determine if the memory location is available. ???

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
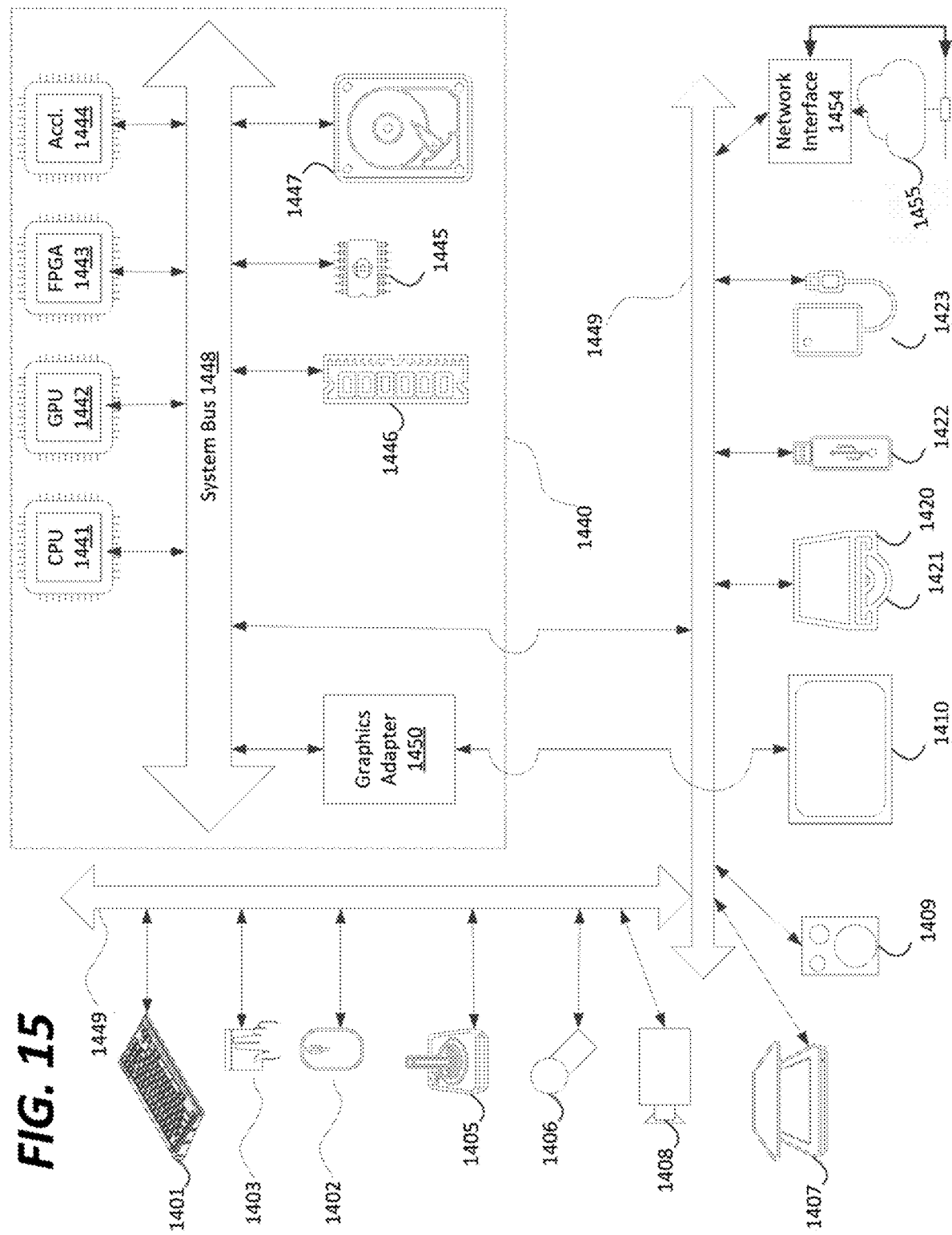
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANB us: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding for a decoder, the method including receiving a coded video bitstream; determining whether a reference block for a current block is located in a different coding tree unit (CTU) than a CTU of the current block, the reference block and current block located in a same picture included in the coded video bitstream; in response to the determination that the reference block is located in the different CTU, determining whether the CTU of the current block and a reference sample memory have a same size; in response to the determination that the CTU of the current block and reference sample memory have a same size: (i) determining a first area in the CTU of the current block that is collocated with a second area in the different CTU, the first area having position coordinates in the CTU of the current block that is the same as position coordinates of the second area in the different CTU of the reference block; (ii) determining, based on a decoding status of the first area, whether a memory location of the reference sample memory for the reference block is available; and (iii) in response to the determination that the memory location for the reference block is available, retrieving, from the memory location corresponding to the reference block, one or more samples to decode the current block.

(2) The method according to feature (1), in which the first area is the current block, and the second area is the reference block.

(3) The method according to any one of features (1) or (2), in which each of the first area and second area have a size that is $2^M \times 2^N$.

(4) The method according to feature (3), in which M=6 and N=6.

(5) The method according to any one of features (1)-(4), in which the memory location corresponding to the reference block is determined to be available in response to a determination that the decoding status of the first area indicates that the first area does not include at least one block that is at least partially decoded.

(6) The method according to any one of features (1)-(5), further including: in response to the determination that the reference sample memory and the CTU of the current block are not the same size, determining whether the size of the CTU of the current block is less than the size of the reference sample memory; in response to the determination that the size of the CTU of the current block is less than the size of the reference sample memory, determining whether a distance between the different CTU of the reference block and the CTU of the current block is less than a threshold defined as: ((reference sample memory size/CTU size)−1)*(CTU width); in response to the determination that the distance is less than the threshold, retrieving, from the memory location corresponding to the reference block, one or more samples to decode the current block.

(7) The method according feature (6), further including: in response to the determination that the distance is greater than or equal to the threshold, (i) determining a first area in the CTU of the current block that is collocated with a second area in the different CTU, the first area having position coordinates in the CTU of the current block that is the same as position coordinates of the second area in the different CTU of the reference block; (ii) determining, based on a decoding status of the first area, whether a memory location of the reference sample memory for the reference block is available; and (iii) in response to the determination that the memory location for the reference block is available, retrieving, from the memory location corresponding to the reference block, one or more samples to decode the current block.

(8) A video decoder for video decoding, including processing circuitry configured to: receive a coded video bitstream, determine whether a reference block for a current block is located in a different coding tree unit (CTU) than a CTU of the current block, the reference block and current block located in a same picture included in the coded video bitstream, in response to the determination that the reference block is located in the different CTU, determine whether the CTU of the current block and a reference sample memory have a same size; in response to the determination that the CTU of the current block and reference sample memory have a same size: (i) determine a first area in the CTU of the current block that is collocated with a second area in the different CTU, the first area having position coordinates in the CTU of the current block that is the same as position coordinates of the second area in the different CTU of the reference block, (ii) determine, based on a decoding status of the first area, whether a memory location of the reference sample memory for the reference block is available, and (iii) in response to the determination that the memory location for the reference block is available, retrieving, from the memory location corresponding to the reference block, one or more samples to decode the current block.

(9) The video decoder according to feature (8), in which the first area is the current block, and the second area is the reference block.

(10) The video decoder according to feature (8) or (9), in which each of the first area and second area have a size that is $2^M \times 2^N$.

(11) The video decoder according to feature (10), in which M=6 and N=6.

(12) The video decoder according to any one of features (8)-(11), in which the memory location corresponding to the reference block is determined to be available in response to a determination that the decoding status of the first area indicates that the first area does not include at least one block that is at least partially decoded.

(13) The video decoder according to any one of features (8)-(12), in which the processing circuitry is further configured to: in response to the determination that the reference sample memory and the CTU of the current block are not the same size, determine whether the size of the CTU of the current block is less than the size of the reference sample memory, in response to the determination that the size of the CTU of the current block is less than the size of the reference sample memory, determine whether a distance between the different CTU of the reference block and the CTU of the current block is less than a threshold defined as: ((reference sample memory size/CTU size)−1)*(CTU width), in response to the determination that the distance is less than the threshold, retrieve, from the memory location corresponding to the reference block, one or more samples to decode the current block.

(14) The video decoder according to feature (13), in which the processing circuitry is further configured to: in response to the determination that the distance is greater than or equal to the threshold, (i) determine a first area in the CTU of the current block that is collocated with a second area in the different CTU, the first area having position coordinates in the CTU of the current block that is the same as position coordinates of the second area in the different CTU of the reference block, (ii) determine, based on a decoding status of the first area, whether a memory location of the reference sample memory for the reference block is available, and (iii) in response to the determination that the memory location for the reference block is available, retrieving, from the memory location corresponding to the reference block, one or more samples to decode the current block.

(15) A non-transitory computer readable medium having instructions stored therein, which when executed by a processor in a video decoder causes the process to execute a method including receiving a coded video bitstream; determining whether a reference block for a current block is located in a different coding tree unit (CTU) than a CTU of the current block, the reference block and current block located in a same picture included in the coded video bitstream; in response to the determination that the reference block is located in the different CTU, determining whether the CTU of the current block and a reference sample memory have a same size; in response to the determination that the CTU of the current block and reference sample memory have a same size: (i) determining a first area in the CTU of the current block that is collocated with a second area in the different CTU, the first area having position coordinates in the CTU of the current block that is the same as position coordinates of the second area in the different CTU of the reference block; (ii) determining, based on a decoding status of the first area, whether a memory location of the reference sample memory for the reference block is available; and (iii) in response to the determination that the memory location for the reference block is available, retrieving, from the memory location corresponding to the reference block, one or more samples to decode the current block.

(16) The non-transitory computer readable medium according to feature (15), in which the first area is the current block, and the second area is the reference block.

(17) The non-transitory computer readable medium according to feature (15) or (16), in which each of the first area and second area have a size that is $2^M \times 2^N$.

(18) The non-transitory computer readable medium according to any one of features (15)-(17), in which the memory location corresponding to the reference block is determined to be available in response to a determination that the decoding status of the first area indicates that the first area does not include at least one block that is at least partially decoded.

(19) The non-transitory computer readable medium according to any one of features (15)-(18), the method further including: in response to the determination that the reference sample memory and the CTU of the current block are not the same size, determining whether the size of the CTU of the current block is less than the size of the reference sample memory; in response to the determination that the size of the CTU of the current block is less than the size of the reference sample memory, determining whether a distance between the different CTU of the reference block and the CTU of the current block is less than a threshold defined as: ((reference sample memory size/CTU size)−1)*(CTU width); in response to the determination that the distance is less than the threshold, retrieving, from the memory location corresponding to the reference block, one or more samples to decode the current block.

(20) The non-transitory computer readable medium according to feature (19), further comprising: in response to the determination that the distance is greater than or equal to the threshold, (i) determining a first area in the CTU of the current block that is collocated with a second area in the different CTU, the first area having position coordinates in the CTU of the current block that is the same as position coordinates of the second area in the different CTU of the reference block; (ii) determining, based on a decoding status of the first area, whether a memory location of the reference sample memory for the reference block is available; and (iii) in response to the determination that the memory location for the reference block is available, retrieving, from the memory location corresponding to the reference block, one or more samples to decode the current block.

What is claimed is:

1. A method of video encoding, the method comprising:
determining a first area in a coding tree unit (CTU) of a current block of a picture that is collocated with a second area in a different CTU of the picture, the first area and the second area having a same position in the CTU of the current block and the different CTU;
determining, based on a decoding status of the first area at a time point when the current block is to be decoded, whether one or more reference blocks of the second area are available for encoding the current block; and
in response to a determination that the one or more reference blocks of the second area are available, encoding the current block based on one or more reference blocks of the second area.

2. The method according to claim 1, wherein the first area is the current block, and the second area is one reference block.

3. The method according to claim 1, wherein each of the first area and second area have a size that is 2M×2N.

4. The method according to claim 3, wherein M=6 and N=6.

5. The method of claim 1, wherein the one or more reference blocks of the second area are determined to be available in response to a determination that the decoding status of the first area at the time point when the current block is to be decoded indicates that the first area does not include at least one block that is at least partially decoded.

6. The method of claim 1, further comprising:
determining whether a size of the CTU of the current block is less than a size of a reference sample memory;
in response to a determination that the size of the CTU of the current block is less than the size of the reference sample memory, determining whether a distance between the different CTU and the CTU of the current block is less than or equal to a threshold defined as:

((reference sample memory size/CTU size)−1)*(CTU width); and in response to a determination that the distance is less than or equal to the threshold, encoding the current block based on the one or more reference blocks of the second area.

7. The method of claim 6, further comprising:
in response to a determination that the distance is greater than the threshold, (i) determining the first area in the CTU of the current block that is collocated with the second area in the different CTU;
(ii) determining, based on the decoding status of the first area at the time point when the current block is to be decoded, whether the one or more the reference blocks of the second area are available; and
(iii) in response to the determination that the one or more reference blocks are available, encoding the current block based on the one or more reference blocks of the second area.

8. An apparatus for video decoding, comprising:
processing circuitry configured to:
determine a first area in a coding tree unit (CTU) of a current block of a picture that is collocated with a second area in a different CTU of the picture, the first area and the second area having a same position in the CTU of the current block and the different CTU, determine, based on a decoding status of the first area at a time point when the current block is to be decoded, whether one or more reference blocks of the second area are available for reconstructing the current block, and in response to a determination that the one or more reference blocks of the second area are available, reconstruct the current block based on one or more reference blocks of the second area.

9. The apparatus according to claim 8, wherein the first area is the current block, and the second area is one reference block.

10. The apparatus according to claim 8, wherein each of the first area and second area have a size that is 2M×2N.

11. The apparatus according to claim 10, wherein M=6 and N=6.

12. The apparatus according to claim 8, wherein the one or more reference blocks of the second area are determined to be available in response to a determination that the decoding status of the first area at the time point when the current block is to be decoded indicates that the first area does not include at least one block that is at least partially decoded.

13. The apparatus according to claim 8, the processing circuitry further configured to:

determine whether a size of the CTU of the current block is less than a size of a reference sample memory, in response to a determination that the size of the CTU of the current block is less than the size of the reference sample memory, determine whether a distance between the different CTU and the CTU of the current block is less than or equal to a threshold defined as:

((reference sample memory size/CTU size)−1)*(CTU width), and in response to a determination that the distance is less than or equal to the threshold, reconstruct the current block based on the one or more reference blocks of the second area.

14. The apparatus according to claim 13, further comprising:

in response to a determination that the distance is greater than the threshold, (i) determine the first area in the CTU of the current block that is collocated with the second area in the different CTU, (ii) determine, based on the decoding status of the first area at the time point when the current block is to be decoded, whether the one or more reference blocks of the second area are available, and (iii) in response to the determination that the one or more reference blocks are available, reconstruct the current block based on the one or more reference blocks of the second area.

15. A method of processing visual media data, the method comprising:

processing a bitstream of the visual media data according to a format rule, wherein the bitstream includes coded information of a current block, the format rule specifies that a first area in a coding tree unit (CTU) of the current block that is collocated with a second area in a different CTU is determined, the first area and the second area having a same position in the CTU of the current block and the different CTU;

the format rule specifies that whether one or more reference blocks of the second area are available for encoding the current block is determined based on a decoding status of the first area at a time point when the current block is to be decoded; and the format rule specifies that the current block is reconstructed based on one or more reference blocks of the second area in response to a determination that the one or more reference blocks of the second area are available.

16. The method according to claim 15, wherein the first area is the current block, and the second area is one reference block.

17. The method according to claim 15, wherein each of the first area and second area have a size that is 2M×2N.

18. The method according to claim 17, wherein M=6 and N=6.

19. The method according to claim 15, wherein the one or more reference blocks of the second area are determined to be available in response to a determination that the decoding status of the first area at the time point when the current block is to be decoded indicates that the first area does not include at least one block that is at least partially decoded.

20. The method according to claim 15, the method further comprising:

determining whether a size of the CTU of the current block is less than a size of a reference sample memory;

in response to a determination that the size of the CTU of the current block is less than the size of the reference sample memory, determining whether a distance between the different CTU and the CTU of the current block is less than or equal to a threshold defined as:

((reference sample memory size/CTU size)−1)*(CTU width); and in response to a determination that the distance is less than or equal to the threshold, encoding the current block based on the one or more reference blocks of the second area.

* * * * *